(12) United States Patent
Parkkinen et al.

(10) Patent No.: US 10,114,908 B2
(45) Date of Patent: Oct. 30, 2018

(54) HYBRID TABLE IMPLEMENTATION BY USING BUFFER POOL AS PERMANENT IN-MEMORY STORAGE FOR MEMORY-RESIDENT DATA

(71) Applicant: International Business Machines Corporation, Armonk, NY (US)

(72) Inventors: Jarmo Parkkinen, Helsinki (FI); Vilho T. Raatikka, Helsinki (FI); Jarmo K. Ruuth, Espoo (FI); Petri U. Soini, Vantaa (FI); Antoni Wolski, Kirkkonummmi (FI)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/675,634

(22) Filed: Nov. 13, 2012

(65) Prior Publication Data

US 2014/0136510 A1    May 15, 2014

(51) Int. Cl.
*G06F 17/30*    (2006.01)

(52) U.S. Cl.
CPC .. *G06F 17/30946* (2013.01); *G06F 17/30079* (2013.01); *G06F 17/30336* (2013.01)

(58) Field of Classification Search
CPC ............... G06F 12/0246; G06F 12/023; G06F 12/1009; G06F 12/0866; G06F 12/0811; G06F 17/30327; G06F 17/30961; G06F 17/30336; G06F 9/30123; G06F 11/203
USPC .......................... 707/706, 711, 712, 713, 696
See application file for complete search history.

(56) References Cited

U.S. PATENT DOCUMENTS

| 5,568,638 | A | 10/1996 | Hayashi et al. |
| 7,113,953 | B2 | 9/2006 | Brown et al. |
| 7,809,674 | B2 * | 10/2010 | Chong et al. ................. 707/741 |
| 8,180,763 | B2 * | 5/2012 | Freedman et al. ............ 707/713 |
| 8,484,434 | B2 * | 7/2013 | Caprioli et al. .............. 711/205 |
| 9,495,398 | B2 | 11/2016 | Parkkinen et al. |

(Continued)

FOREIGN PATENT DOCUMENTS

| CN | 102016808 A | 4/2011 |
| JP | 2006276926 A | 10/2006 |
| JP | 2011108027 A | 6/2011 |

OTHER PUBLICATIONS

Guisado-Gamez, J. et al.; "Hybrid in-memory and on-disk tables for speeding up table accesses" in Database and Expert Systems Applications, Lecture Notes in Computer Science, 2011, vol. 6261/2011; pp. 231-240.

(Continued)

*Primary Examiner* — Robert Beausoliel, Jr.
*Assistant Examiner* — Pedro J Santos
(74) *Attorney, Agent, or Firm* — Cantor Colburn LLP

(57) ABSTRACT

Embodiments relate to a method, system, and computer program product for data management. An aspect includes a search index that is created for a database. The search index has a reference value of a first or a second type associating data to a storage location in a first memory or a second memory respectively. Responsive to a data retrieval request, data is accessed using the reference value from the first or the second memory. If there is a data migration between the first and second memory storage, the reference values are then recalculated and altered in the search index accordingly.

17 Claims, 2 Drawing Sheets

(56) References Cited

U.S. PATENT DOCUMENTS

| | | | |
|---|---|---|---|
| 2008/0263061 A1 | 10/2008 | Nath et al. | |
| 2009/0259644 A1 | 10/2009 | Scheuermann | |
| 2010/0217953 A1 | 8/2010 | Beaman et al. | |
| 2011/0208737 A1* | 8/2011 | Shmueli et al. | 707/737 |
| 2011/0246425 A1 | 10/2011 | Munoz | |
| 2011/0252000 A1 | 10/2011 | Diaconu et al. | |
| 2012/0072652 A1* | 3/2012 | Celis et al. | 711/103 |
| 2012/0109895 A1 | 5/2012 | Zwilling et al. | |
| 2012/0166756 A1 | 6/2012 | Caprioli et al. | |

OTHER PUBLICATIONS

Graefe, G., "Adaptive Indexing for Relational Keys", Data Engineering Workshops (ICDEW), 2010 IEEE 26th International Conference on Date of Conference: Mar. 1-6, 2010, http://ieeexplore.ieee.org/xpl/articleDetails.jsp?tp=&arnumber=5452743&contentType=Conference+Publications&queryText%3Din-memory+indexes+and+traditional+buffer+pool+techniques, 7 pages.

Hu, Jinjin et al., "Research of Main Memory Database Data Organization", Multimedia Technology (ICMT), 2011 International Conference, Date of Conference: Jul. 26-28, 2011 IEEE, pp. 3187-3191.

Final Office Action from the USPTO for U.S. Appl. No. 13/360,886, mailed Sep. 11, 2013, 25 pages.

Non Final Office Action from USPTO for U.S. Appl. No. 13/360,886, mailed Apr. 11, 2013, 14 pages.

Stonebaker, Michael, "Inclusion of New Types in Relational Data Base Systems", ICDE 1986 Citeseer, U.S. Air Force Office of Scientific Research Grant 83-0254 and Naval Electronics Systems Command Contract N39-82-C-0235, 19 pages.

Google search regarding "locating rows "hybrid table" faster", 1 pg.

Hellerstein et al., "Readings in Database Systems", 2005 Massachusetts Institute of Technology, 5 pgs.

Hellerstein et al., "Readings in Database Systems", 2005 Massachusetts Institute of Technology, 5 pages.

JP Decision to Grant a Patent and English Translation; Application No. JP 2013-215799; Dated Jun. 5, 2018; 6 pages.

* cited by examiner

HYBRID TABLE IMPLEMENTATION BY USING BUFFER POOL AS PERMANENT IN-MEMORY STORAGE FOR MEMORY-RESIDENT DATA

BACKGROUND

The present disclosure relates generally to field of database search and storage; and more specifically to a hybrid table implementation by using buffer pool as permanent in-memory storage for memory resident-data.

Many large databases are primarily stored on a disk. These disk based databases, often use a buffer to retrieve newly accessed data to increase performance. Disk-based databases often share buffer space to optimize space and increase performance of the system. However, the pooling of the buffer creates performance bottlenecks when sending or receiving data, which are often caused by the disk input-output (I/O) requirements.

To reduce such bottlenecks and avoid the performance issues, in-memory databases are sometimes used. In an in-memory database, the primary location of data is in the physical or permanent memory. Most in-memory databases are characterized by memory optimized data structures and access methods. Performance is greatly enhanced by sorting, storing and retrieving specified data entirely from the in-memory, rather than going to disk based. Using an in-memory database allows access requests to be executed without dealing with the issues of disk I/O bottlenecks provided in the code path. However, using an in-memory database scheme has many trade-offs as the storage cost per data unit is higher for the in-memory database than for a disk memory scheme. This is because a less costly hard disk can be substituted for more memory. In addition, random access memories (RAM) chips used for in-memory database schemes cannot approach the density of a small hard drive. Another issue with in-memory databases is that in some applications, mining on large databases cannot be held into in-memory storage due to space constraints. One solution is to use a hybrid search index of databases which uses both "d" and "m" types of databases.

BRIEF SUMMARY

Embodiments include a method, system, and computer program product for data management. In one embodiment, a search index is created for a database and the search index has a reference value of a first or a second type associating data to a storage location in a first memory or a second memory respectively. Responsive to a data retrieval request, data is accessed using the reference value from the first or the second memory. If data is migrated between the first and second memories, the search index reference values are recalculated and altered.

Additional features and advantages are realized through the techniques of the present disclosure. Other embodiments and aspects of the disclosure are described in detail herein. For a better understanding of the disclosure with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The foregoing and other features, and advantages of the disclosure are apparent from the following detailed description taken in conjunction with the accompanying drawings in which:

DETAILED DESCRIPTION

Hybrid search indexing of databases provides flexibility. A hybrid search index database both uses in-memory and disk-based databases. The distinction between the two types of data location is made at the table level. Tables can be designated as an in-memory table (m-table) where the entire contents of that table are stored in memory or alternatively tables can be disk-based (d-table) where the data is stored primarily on disk. Using both in-memory and disk storage achieves a balance between performance and cost.

In most databases, tables are set up and used for data retrieval. A table is a set of data elements or values that is organized into horizontal rows and vertical columns, having a plurality of cells where a row and a column intersect. Conventionally, a table has a specified number of columns, but any number of rows. Each row is identified by the values appearing in a particular column subset which has been identified as a unique key index. To improve the speed of data retrieval operations, a database index is used. Indices can be created using one or more columns of a database table, providing the basis for both rapid random lookups and efficient access of ordered records.

The dichotomy of using two different database types in a single setting poses when using hybrid search indexing still poses a challenge because these databases have different requirements. One conceivable solution is to provide a scheme where a new index is layered on top of one another (separate m-part and d-part indexes). But this solution can also be inefficient as it forces a continuous switching between the m-part and the d-parts of two separate tables when data is being accessed. This can become both resource intensive and time consuming. In addition, such an index may have footprint requirements that can prove to be too large for available storage in most memories.

Figure 1:
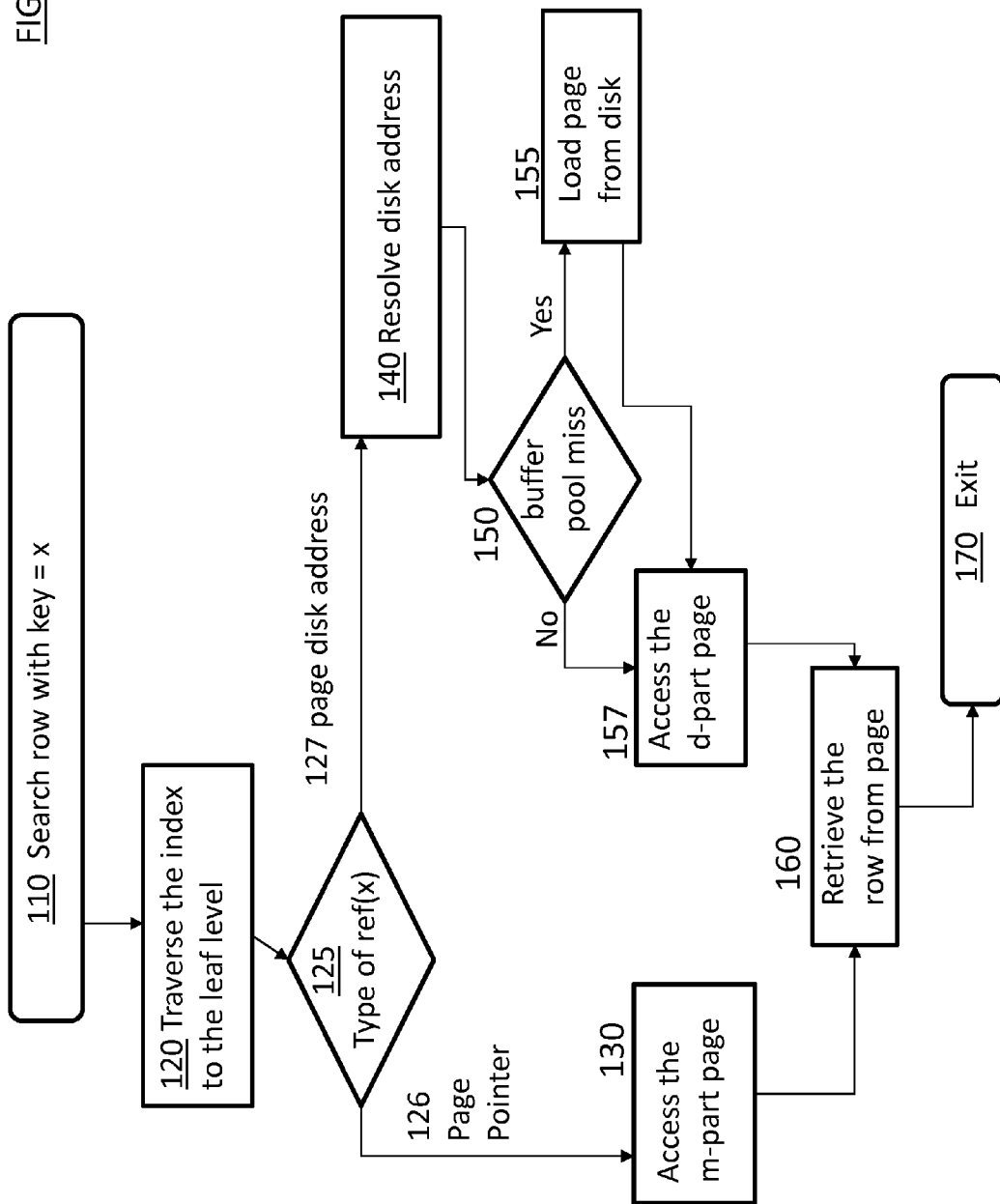
FIG. 1 is a flowchart illustration in accordance with an embodiment.

FIG. 1 shows a flowchart implementation of one embodiment where a hybrid database is used that optimizes resource and search time. As shown in FIG. 1, while two types of memories are used, such as in one embodiment a disk storage memory and an in-memory, constant switching is not necessary as the combination of using a reference value and a buffer pool allow identification of storage of data in the disk storage or in-memory storage. The access to the buffer pool and to the disk and/or in-memory storage can be understood better by reference to FIG. 2.

Figure 2:
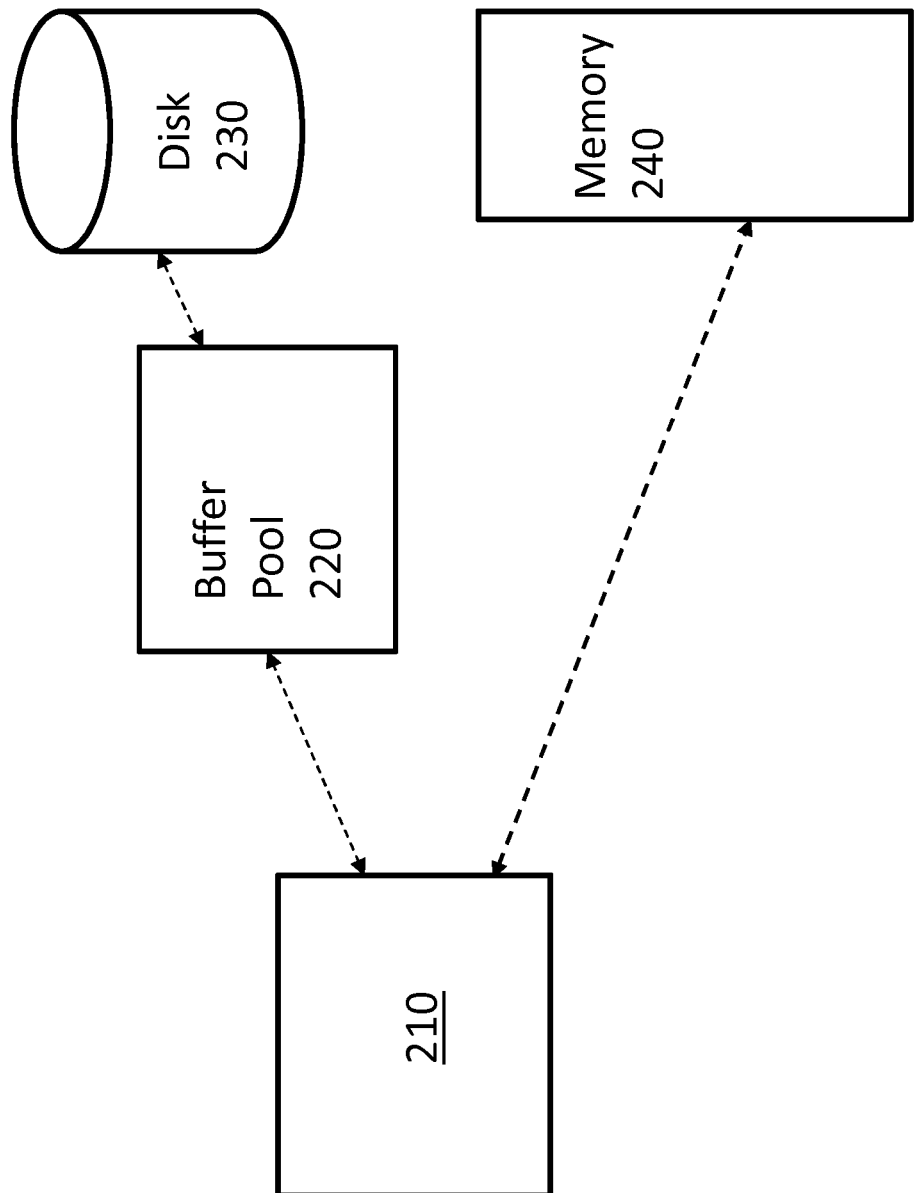
FIG. 2 depicts a block diagram illustrating memory access to data and a buffer, in accordance with an embodiment.

FIG. 2 illustrates a block diagram as per one embodiment that can be used in accordance with the flowchart of FIG. 1. In FIG. 2, memory access to the storage database is optimized via the use of a buffer 220 which is in processing communication with an in-memory or permanent memory storage 240 and a disk memory storage 230. In the embodiment shown in FIG. 2, the in-memory or permanent memory is in processing communication with the buffer 220 via a search engine 210, but in alternate embodiments direct processing access can also be provided. It should be noted that permanent, physical and in-memory storages are used interchangeably to mean the same type of memory storage. In one embodiment, memory access can be achieved to both memory storages via the search engine 210 that can be implemented using one or more processors. The digital devices using the search engine 210 can represent a variety of digital devices, such as but not limited to mobile devices, personal computers, servers or and may include or be in processing communication further with displays, printers or other components as can be appreciated by those skilled in the art. In other embodiments buffer 220 and disk storage 230 and in-memory storage 240 may be part of a unitary device and access may be performed directly to them with or without a separate search engine 210 such as directly by a processor or computer as can be appreciated by those skilled in the art.

Traditionally, a buffer is a region of a physical memory storage used to temporarily hold data while it is being moved from one place to another. In this way, a buffer can hold information about accessed data from disk storage but only a limited quantity of the disk storage data can be buffered this way. In FIG. 2, the buffer 220 is a buffer pool and can include a buffer pool manager, in one embodiment. An optimized access to the database is then achieved by using the buffer pool as a permanent storage for memory resident data while disk resident data is buffered in the regular way as appreciated by those skilled in the art.

Optimized access as discussed in conjunction with FIGS. 1 and 2, is enabled to be used by many types of search index structures as known to those skilled in the art. An example of this would be a tree structure, simulating a hierarchical tree with a set of linked nodes. A node may contain a value or condition, or represent a separate data structure or even be a tree of its own. Each node in a tree has zero or more child nodes, which are below it in the tree. A node that has a child is called the child's parent node (or ancestor node, or superior). A node has at most one parent. An internal node (also known as an inner node or branch node) is any node of a tree that has child nodes. Similarly, an external node, also known as an outer node, leaf node, or terminal node, is any node that does not have child nodes. Similarly, a tree structure with a binary or N-ary-tree structure can also be used with the optimized access described in conjunction with FIGS. 1 and 2. A binary tree data structure keeps data sorted and allows searches, sequential access, insertions, and deletions in logarithmic time. A N-ary-tree is often has more than two children and is optimized for systems that read and write large blocks of data.

For ease of understanding, the flowchart embodiment of FIG. 2, shows a tree structure with leaf nodes but as discussed other search structures can be used in alternate embodiments. Referring back to FIG. 1, when access to data is needed a search is initiated by first finding the database associated with that data. In the database search index, in one embodiment, this can start by identifying a location in the index such as a row and associated key.

Referring back to FIG. 1, in one embodiment a search index table is then set up so that if the data row (block 110) is found to be in the m-part of the table, the page is accessed via a pointer stored in the leaf node of said index tree and said data found in the d-part of the table is accessed by invoking a buffer pool manager to resolve disk address and initiate a page buffer load. This concept will now be discussed by examining the blocks of FIG. 1's flowchart in more detail.

Starting with block 110, the search index table in this case is finding the entry in this case by searching a particular row with a particular key which by way of example is chosen to be key=x (e.g., a string of numbers or characters). The search is performed to the leaf level of the index structure as shown in block 120. As shown in block 125, the reference to the key is then tested to determine whether the reference is a page pointer or a page disk address. If the reference is a page pointer, then the page pointer is used to access the m-part page which is in the in-memory storage 130 (240 in FIG. 2). At block 160, the row that contains the data matching the key used in the search is then retrieved from the accessed m-part page. On the other hand, if the reference (x) 125 is a page disk address 127, then further processing can be performed to resolve the disk address 140. In addition, at block 150 the page disk address is tested to determine whether the page referenced thereby is present in the buffer pool. Thus at 150, if there is no "buffer pool miss" (i.e. the data is present in the buffer pool), then as shown at 157 the d-part page corresponding to the page disk address is accessed from the buffer pool. Otherwise, if there is a buffer pool miss at 150, then as shown at 155 the referenced page is accessed from the disk memory storage 230 (FIG. 2). A buffer pool manager is then invoked, in one embodiment, to transfer a chunk of data containing referenced page from disk memory storage into the buffer pool. In either case, as shown at 160, the row that contains the data matching the key used in the search is then achieved from the accessed d-part page.

The optimized access as discussed in conjunction with FIG. 2, does not necessitate the need for a large memory footprint. Traditionally, m-table indexes are dense which means the databases is structured such that there is a file with pairs of keys and pointers for every record in the data file. In other words, every key in this file is associated with a particular pointer to a record in the sorted data file. In clustered indices with duplicate keys, the dense index points to the first record with that key. Most often there is a unique key and a reference for each row in the index. On the other hand, a d-table index is often sparse and structured so that a file is provided with pairs of keys and pointers for every block in the data file. Every key in this file is associated with a particular pointer to the block in the sorted data file. In a sparse index, a range of key values is mapped into a single data page. That is possible because the key values are clustered (adjacent values are located in the same page).

Consequently, it is much more advantageous in terms of footprint size to have a sparse database because a dense indexing of all the rows of a hybrid table would require too much space which is the challenge for keeping a single hybrid table. Moreover, with a single hybrid take, a typical page buffer pool solution has to be still retained for efficient loading of d-part data blocks into memory, for processing. Another challenge has been to facilitate easy migration of data between the "m" and "d" parts. However, a single table index that is efficient in accessing the m-parts as memory index and conserves space by including a sparse index, is not sufficient because data migrations between the m-part and the d-part can still be resource-consuming. This is because such migration requires copying the data to be physically transferred from the m-part to the d-part. The need for data migration normally results in data aging which means dealing with older data that is not used frequently and should be migrated to a slower medium.

In the optimized access as discussed in conjunction with FIG. 2, a sparse index can be used and the data can be migrated between the m-part and d-part by simply changing the type of reference and recalculating the reference value. The contents of a page need not be changed. The migration can be done explicitly, in one embodiment, or be associated alternatively with a page replacement mechanism like an LRU (least recently used) queue. The m-part pages not used recently can then be changed to d-part change pages, which effectively inflicts the migration. This provides for an easy data migration between the m-part and the d-part. In addition, the efficiency of the m-table row access is preserved and the table row is accessed via an in-memory index and memory pointers. The access to an m-part row can be more efficient than to a d-part row because in this case the buffer pool manager has to be invoked to resolve the disk page address. The large capacity of the d-part is preserved by allowing the buffer pool manager to translate the disk page addresses to page hits and misses and act appropriately upon them. This addresses many of problems associated with use of index tables that are too large to fit into memory and inflexible and costly to search as discussed, especially in instances where data cannot be fit into memory itself and must be split into separate tables of different types.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

Further, as will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A data management method, comprising:
generating, by a processor of a computing system, a database comprising a database table that is stored in both a first memory comprising an in-memory storage and a second memory comprising a disk memory storage, wherein the database table comprises a plurality of rows, wherein a first portion of the rows is stored in the in-memory storage and a second portion of the rows is stored in the disk memory storage, wherein the subset of the rows of the database table stored in the disk memory device is not stored in the in-memory storage, wherein the database table is indexed by a search index having a plurality of search index reference values each of a first type or second type, the first type being a page pointer to the in-memory storage in a buffer pool, the second type being a page disk address of a page in the disk memory storage that is to be proceed by said buffer pool, and wherein the search index has densely indexed rows that correspond to the subset of the rows of the database stored in the in-memory storage and sparsely indexed rows that correspond to the subset of the rows of the database stored in the disk memory storage;
responsive to a data retrieval request, accessing, by the processor, data from said first or said second memory using a reference value of the plurality of search index reference values, wherein said reference value is of said second type, wherein accessing said data includes determining, by the processor, whether said data is accessible from said buffer pool and then using said reference value of said second type to access said data from said buffer pool if it is determined that said data is accessible from said buffer pool; and
altering said plurality of search index reference values from page pointers to the in-memory storage to page disk addresses in the disk memory in response to data being migrated from the in-memory storage to the disk memory storage based on a least recently used queue of the in-memory storage.

2. The method of claim 1, further comprising using said reference value of said second type to access said particular data from a buffer pool if it is determined that said particular data is accessible from said buffer pool.

3. The method of claim 1, wherein said search index is a tree structured index.

4. The method of claim 3, wherein said tree has leaf nodes.

5. The method of claim 3, wherein data access is provided using said page pointer or said page disk address according to said reference value provided.

6. The method of claim 4, wherein said leaf node indexing reference value for m-data in said permanent memory is a pointer to a page in said buffer and said leaf node indexing reference value for d-data is a disk address.

7. The method of claim 4, wherein said search index is a binary index structure.

8. The method of claim 3, wherein said index has a plurality of rows and columns and said rows have associated keys.

9. The method of claim 8, wherein said ordering of keys correspond to said ordering of rows.

10. The method of claim 6, wherein said migration from one component to another can be accomplished on a page replacement mechanism and said page is being generated by said buffer.

11. The method of claim 10, wherein said migration from one component to another can be accomplished on a least recently used basis.

12. The method of claim 6, wherein said migration from one component to another can be accomplished on an explicit basis.

13. A computer program product for data management the computer program product comprising a non-transitory computer readable storage medium having computer readable program code embodied therewith, said computer readable program code being executable by a computer to:
generate a database comprising a database table that is stored in both a first memory comprising an in-memory storage and a second memory comprising a disk memory storage, wherein the database table comprises a plurality of rows, wherein a first portion of the rows is stored in the in-memory storage and a second portion of the rows is stored in the disk memory storage, wherein the subset of the rows of the database table stored in the disk memory device is not stored in the in-memory storage, wherein the database table is indexed by a search index having a plurality of search index reference values each of a first type or second type, the first type being a page pointer to the in-memory storage in a buffer pool or a second type that is a page disk address of a page in the disk memory storage that is to be proceed by said buffer pool, and wherein the search index has densely indexed rows that correspond to the subset of the rows of the database table stored in the in-memory storage and sparsely indexed rows that correspond to the subset of the rows of the database table stored in the disk memory storage;
responsive to a data retrieval request, access data from said first or said second memory using a reference value of the plurality of search index reference values, wherein said reference value is of said second type, wherein accessing said data includes determining, by the processor, whether said data is accessible from said buffer pool and then using said reference value of said second type to access said data from said buffer pool if it is determined that said data is accessible from said buffer pool; and alter said plurality of search index reference values from page pointers to the in-memory storage to page disk addresses in the disk memory in response to data being migrated from the in-memory storage to the disk memory storage based on a least recently used queue of the in-memory storage.

14. The computer program product of claim 13, wherein said index has a plurality of rows and columns and said index has associated keys corresponding to each row.

15. The computing program product of claim 14, wherein indexing granularity is a page and said index is enabled to have an additional on-page access.

16. The computer program product of claim 15, wherein said index is a sparse index and said d and m pages are identical in structure except for content.

17. A system comprising:
- a database that comprises data stored in both an in-memory storage and a disk memory storage that is in processing communication with the in-memory storage, the database comprising a database table comprising a plurality of rows, wherein a first portion of the rows is stored in the in-memory device storage and a second portion of the rows is stored in the disk memory storage, wherein the subset of the rows of the database stored in the disk memory storage is not stored in the in-memory storage;
- a buffer in processing communication with said in-memory and disk memory storage, said buffer including a buffer pool manager for handling buffer pool; and
- a database search engine having at least a processor for managing a data search index structure, said search index having a plurality of reference values each of a first or a second type such associating data to said in-memory and disk memory storage, wherein the search index has densely indexed rows that correspond to the subset of the rows of the database stored in the in-memory storage and sparsely indexed rows that correspond to the subset of the rows of the database stored in the disk memory storage;

said reference value of first type being a page pointer to in-memory storage in said buffer pool and said reference value of second type being a page disk address to be processed by said buffer pool;

wherein the database search engine is configured to:
- access data from said first or said second memory using a reference value of the plurality of reference values, wherein said reference value is of said second type, wherein accessible from said data includes determining, by the processor, whether said data is accessible from said buffer pool and then using said reference value of said second type to access said data from said buffer pool if it is determined that said data is accessible from said buffer pool; and
- alter said plurality of search index reference values from page pointers to the in-memory storage to page disk addresses in the disk memory in response to data being migrated from the in-memory storage to the disk memory storage, wherein the data is migrated based on a least recently used queue of the in-memory storage.

* * * * *